United States Patent [19]

Sweeney et al.

[11] 4,312,033
[45] Jan. 19, 1982

[54] DIGITAL MOTOR CONTROL FOR POSITIONING SYSTEM

[76] Inventors: James S. Sweeney; James S. Sweeney, Jr., both of 2775 Temple Hills Dr., Laguna Beach, Calif. 92651

[21] Appl. No.: 62,416

[22] Filed: Jul. 31, 1979

[51] Int. Cl.³ .................. G06F 15/46; G05B 11/18; G05B 11/28
[52] U.S. Cl. .................. 364/167; 318/594; 318/599; 364/182
[58] Field of Search .............. 364/118, 114, 115, 474; 318/592, 593, 594, 595, 601, 603, 640, 599

[56] References Cited

U.S. PATENT DOCUMENTS

| | | | |
|---|---|---|---|
| 3,098,187 | 7/1963 | Sciaky | 318/594 X |
| 3,323,030 | 5/1967 | Inaba et al. | 318/594 X |
| 3,458,786 | 7/1969 | Thompson | 318/594 |
| 3,493,827 | 2/1970 | Tinkler | 318/594 |
| 3,566,239 | 2/1971 | Taniguchi | 318/593 |
| 3,839,664 | 10/1974 | Dirks et al. | 318/594 X |
| 3,986,091 | 10/1976 | Quiogue et al. | 318/594 |
| 4,021,714 | 5/1977 | Jones | 318/594 |
| 4,138,632 | 2/1979 | Pauwels et al. | 318/599 |
| 4,146,828 | 3/1979 | Ross et al. | 318/599 |

*Primary Examiner*—Joseph F. Ruggiero
*Attorney, Agent, or Firm*—Thomas J. Plante

[57] ABSTRACT

A digital motor control positioning system, and method, are disclosed in which lead screw position is measured by an encoder, and the error between that position and the destination is measured, either continuously or repetitively, to provide digital, distance-representing control pulses to the motor. In the final, settling-in portion of motor movement, it is successively started and stopped to provide incremental distance movements, which preferably are reduced in size as the destination is approached.

27 Claims, 10 Drawing Figures

DIGITAL MOTOR CONTROL FOR POSITIONING SYSTEM

BACKGROUND OF THE INVENTION

This invention relates to a digital system for controlling a motor, which moves a machine or other device accurately to a pre-selected new position. There are many uses for control systems of this type, but one of the primary reasons for development of the present invention relates to problems inherent in devices moved by lead screws.

Lead screw driven devices have a "backlash" problem if the position feedback information is derived from measurement of the lead screw rotation rather than measurement of the position of the element driven by the lead screw. If the movement of the device in the initial direction leads to an "overshoot", the corrective motion in the reverse direction has an unacceptable hysteresis, or margin of error, because of the backlash in the lead screw driving mechanism. Therefore, the aim in such a mechanism is to cause the device to "settle into" its final position by means of movement in one direction only, and to always move into its final position from the same direction.

Conventional analog servo systems usually employ a controller which outputs a control signal proportional to an error signal, representing the difference between the command input and the actual output. For optimal control of such systems, the output in response to a step function command will have a critically damped response. For reasonably accurate control an overshoot is required, and a velocity control measurement is usually needed for stability. There is a tendency of such systems to oscillate at zero, or null, position. For the reasons already discussed, that tendency creates a serious problem in a lead screw position control system.

The digital counterpart of the conventional analog servo system usually varies the frequency of the motor drive signal to vary the motion velocity. Broadly speaking, in the context of the present discussion, such a system does not function differently from the conventional analog servo system. It has the same susceptibility to difficulties caused by the backlash problem in lead screw position control systems.

One of the specific problems for which the present invention was developed was the control of paper cutting machines. The general practice with such machines heretofore has been to use a high speed motor, a low speed motor, and a brake. The strategy in such a system is to run at high speed until close to the target, then run at slow speed, and finally apply the brake to stop the machine instantaneously. Such a system is not very accurate, and the use of the brake is damaging to the control system. Furthermore, it requires measurement and braking of the driven element directly, because of the inertia of the driven element relative to the lead screw.

While the problem of hysteresis, or position inaccuracy due to "hunting", can be at least partially avoided by direct measurement of the location of the element whose position is being changed, this is often highly impractical, and excessively expensive. For one thing, the distance measurement must be continuous, and must relate to a specific starting point. In other words, continuous base point to end point measurement is required. If large distances are to be covered, as on a large machine table, a highly accurate, direct measurement of the moving element is extremely difficult. For this reason, it is very desirable to use lead screw measurement to determine position.

The problem of inaccuracy due to hunting also arises wherever there is "slack", or elasticity, in the driving system, if it is desired to measure position from the position of the driving mechanism. Such elasticity or slack exists in belt-driven systems, geared drives, fluid couplings, and the like.

Various efforts have been made to solve this problem by assuring that the device "settles in" to its new position from one direction only. One such approach is to use a stepper motor for final settling. There is an inherent cost problem in using a stepper motor, because of the gearing ratio required to provide the desired resolution accuracy. For example, if we assume a resolution of 0.001 inch is required, this necessitates 1,000 steps per inch, requiring a complex and costly control system and motor.

Another approach to the unidirectional settling problem has been the use of timed pulses directed to a motor to provide an incremental pulse train for the settling motion. This works quite well where friction and inertia are reasonably constant over the entire motion path, and the load is constant. But this rarely is the case.

The present invention provides a simple, but elegant, solution for the problems explained above. Furthermore, its accuracy, and relatively lower cost because of simplicity, make it a desirable position control system even where it would be feasible to provide direct measurement of the driven element. In other words, its usefulness is not limited to systems which involve the hysteresis problem, such as systems in which the lead screw is measured instead of the driven element.

SUMMARY OF THE INVENTION

The present invention provides a settling-in motion of the driver element by causing the driving motor to start-and-stop in a series of variable length driving pulses. The movements of the driven element during the settling-in phase are a series of incremental movements determined by a series of interim target positions. The next interim target position is determined after each stop of the driven element. Each position of the driven element is indicated by a position-to-digital transducer; and the final, or destination, position is reached when a digital comparator indicates that the actual position indicated by the transducer is substantially the same as the destination position indicated by a digital command.

In the preferred version of the invention, during the settling-in phase each movement of the driven element is stopped after a lesser distance has been covered than in the preceding movement, each motor driving pulse being ended when the driven element, as indicated by the transducer, has reached its next interim target position, which was selected after the last stop of the driven element.

In a machine where a table is to be positioned by a motor driving a lead screw, lead screw rotation is measured by a digital sensor which thus yields table position. The digital sensor is provided with a range of bit sizes which are graduated from a maximum value to a minimum value. A digital comparator measures (either continuously or repetitively) the difference between the present lead screw position, as measured by the digital sensor, and the desired lead screw position. The result is an error term. If the error term is relatively large, a control line is selected which causes a higher order sensor bit to be selected. The motor is automatically commanded to move until a change is detected in the higher order bit sensing, at which time the motor automatically stops. Error is again measured, and an appropriate lower order bit is selected, initiating the motor driving action again for the duration of the shorter distance. The motor starting and stopping process is continued, with a shorter distance pulse each time until the lowest order bit available is used for the final adjustment, which reduces the error below a pre-selected amount, at which time the process automatically terminates.

DETAILED DESCRIPTION OF SPECIFIC EMBODIMENTS

Figure 1:
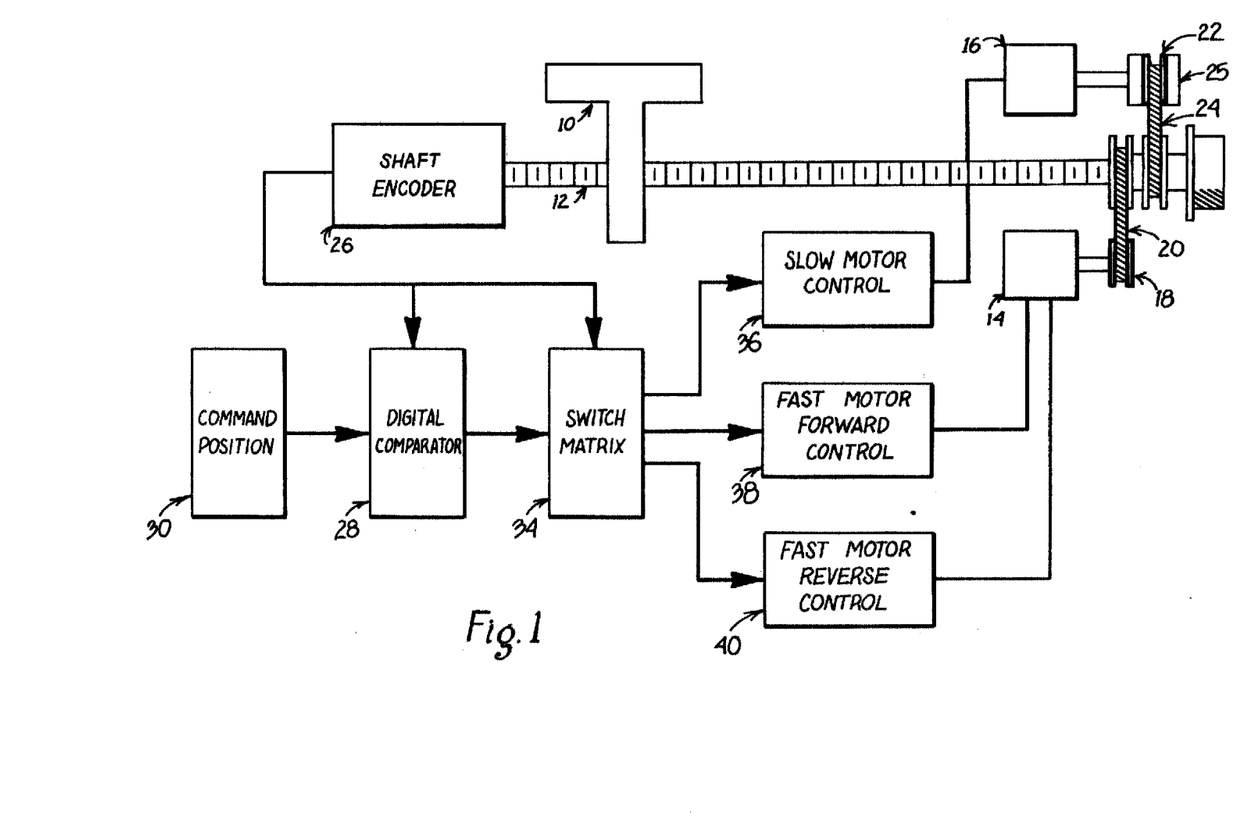
FIG. 1 is a diagrammatic showing of a machine position control system embodying the present invention.

An overall layout of a machine position control system embodying the present invention is shown in FIG. 1. As indicated above, many other specific uses could be made of the inventive concepts discussed herein; and they could be utilized in many different embodiments. But the system of FIG. 1 provides a convenient illustration to permit understanding of the principles involved.

A driven element 10, such as a work table, is arranged to be moved to left or right by rotation of a lead screw 12. The lead screw is caused to rotate by one or more electric motors, which may be standard AC motors. In the illustrated embodiment, two motors are used—a relatively fast speed motor 14 and a relatively slow speed motor 16. The fast speed motor turns the lead screw until the driven member 10 is within a predetermined distance from the destination position; at that point the slow speed motor takes over. The fast motor 14 may drive a pulley 18, which moves a belt 20 to turn the lead screw; and the slow motor 16 may drive a pulley 22, which moves a belt 24 to turn the lead screw. The fast motor is designated to drive in either forward or reverse, whereas the slow motor drives in the forward direction only. An automatically controlled clutch 25 may be used between the slow motor 16 and the lead screw 12 to prevent movement of the slow motor when the fast motor is driving the lead screw.

One of the requirements for successful operation of a system of this type is that the driven element 10 must "settle in" to its final position from one direction only, preferably the forward position. If we assume that the left end of the lead screw, as seen in FIG. 1, is the base, or reference, point for the driven element 10, then its "settling in" motion will be solely motion from left to right. This prevents "backlash", or hysteresis, in the driving connection between lead screw 12 and element 10 from affecting the accuracy of the distance moved by element 10 in reaching its destination position. If the element 10 accidentally "overshoots", or if the next selected position of element 10 is to the left of its current position, the fast motor reverse driving motion is used to move the element 10 from right to left until it reaches a position leftward of the desired position, and thereafter settling movement from left to right is automatically resumed.

The key components of the control system are a shaft encoder 26 which continuously measures the position of lead screw 12, and a digital comparator 28 which compares the position signals from encoder 26 with control signals which indicate what position the lead screw should find. Thus the shaft encoder 26 provides a position-to-digital transducer, the signals from which can be readily compared by comparator 28 with the digital instructions inserted into the system by the operator, by a microprocessor, or by any other desired command means.

In FIG. 1 the block diagram also shows a command position 30, a switch matrix 34, a motor control 36, a fast motor forward control 38, and a fast motor reverse control 40.

Figure 2A:
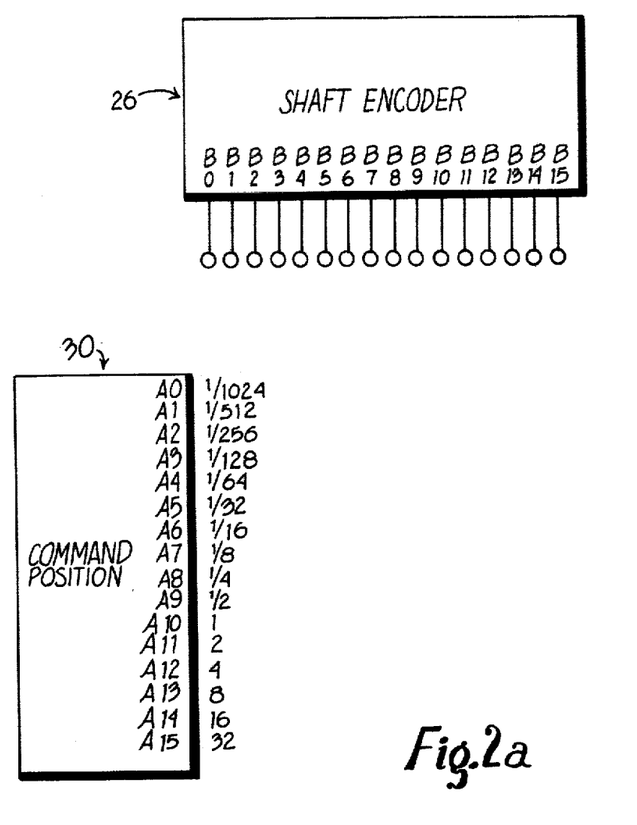
FIGS. 2A and 2B are subsystem diagrams of a portion of an electronic circuit capable of controlling the machine of FIG. 1, comprising the parts therein designated "Digital Comparator", "Shaft Encoder" and "Command Position"

FIG. 2A illustrates, in purely block diagram form, the electronic relationships among the shaft encoder 26, digital comparator 28, and command position 30. The digital system used is binary. Any desired digital system could be substituted, but a binary system is preferred because of its relative simplicity. In the illustrated version of the invention, a 16 bit binary shaft encoder converts to a driven element range of approximately 64 inches, combined with a resolution of 1/1024 inch. The command position bits are identified by the letter "A" combined with the numerals 0 through 15; whereas the corresponding bits of the shaft encoder are identified by the letter "B" combined with the numerals 0 through 15. Corresponding numerals represent equal bit sizes, i.e., distances.

It is convenient to design the lead screw in such a way that a bit on the encoder which is 1/1024 of the 360° encoder motion corresponds to an axial movement of the lead screw amounting to 1/1024 inch. However, this relationship obviously could be varied to suit design requirements.

Figure 5:
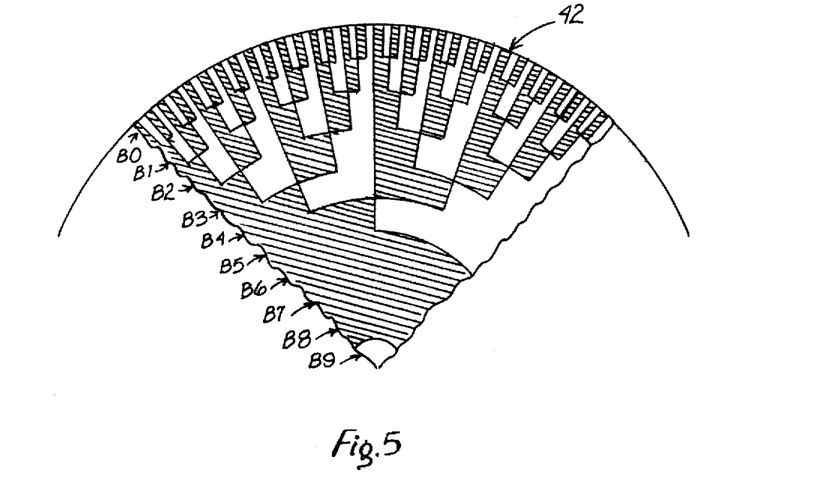
FIG. 5 illustrates the relationship of binary digital elements on the shaft encoder of FIGS. 1 and 2.
Figure 6:
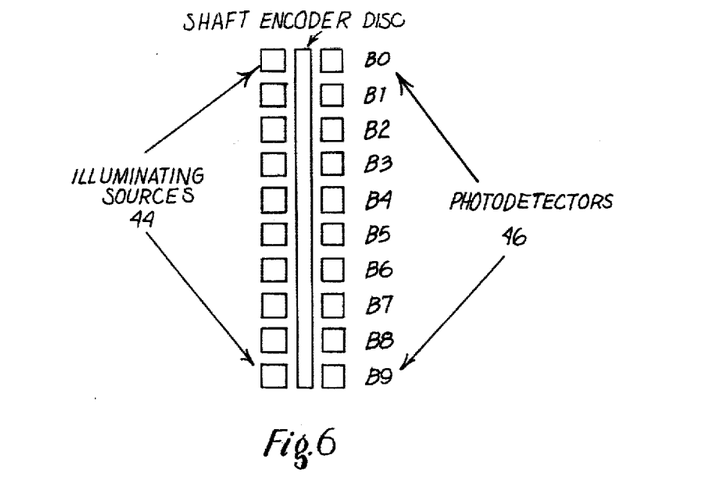
FIG. 6 illustrates the relationship between the shaft encoder disc and the photodetector elements which signal the encoder position.

As shown in FIGS. 5 and 6, the encoder is illustrated as an absolute encoder having 10 rows of bits arranged along its radius. The innermost bit measures ½ of an encoder revolution; the bits in the next row out measure ¼ of an encoder revolution; the bits in the third row out measure ⅛ of an encoder revolution; and so on, in binary progression until the bits in the outermost, or 10th row, measure 1/1024 of an encoder revolution. The remaining six larger distances are represented by 1, 2, 4, 8, 16 or 32 revolutions of the encoder, which can be measured by suitable means for counting the revolutions, either provided as logic hardware or as a function of a programmed microprocessor.

FIG. 5 shows 10 rows of encoder bits on a segment of the encoder disc 42 of shaft encoder 26, the lowest order bits, designated B0, constituting the outer peripheral row, and the highest order bits on the disc, designated B9, being near the center of the disc. The binary progression of bits from B0 (1/1024 revolution) to B1 (1/512 revolution) to B2 (1/256 revolution) and so on to B9 ($\frac{1}{2}$ revolution) is provided by the 10 rows of bits. The drawing is illustrative only and is not scaled circumferentially to provide the full number of bits; it shows 32 bits on row B0, which would constitute 32/1024 of the full circle, or 11.25°/360°.

FIG. 6 shows 10 sensor combinations associated with the encoder disc, each comprising an illuminating source 44 on one side of the encoder disc, and a photodetector 46 on the other side of the disc. The radially outer combination is designated B0, the next combination moving radially toward the disc axis is B1, the next B2, and so on.

The encoder may take various other forms, such as a quadrature output encoder. But the essential principles of operation remain the same.

The bits represented by the output of encoder 26 and the command position 30, in the particular relationship shown, represent the following numerical values, which obviously can be varied for use in other control systems incorporating the present invention.

| | | |
|---|---|---|
| A0 = B0 = 1/1024 | revolution = 1/1024 | inch |
| A1 = B1 = 1/512 | revolution = 1/512 | inch |
| A2 = B2 = 1/256 | revolution = 1/256 | inch |
| A3 = B3 = 1/128 | revolution = 1/128 | inch |
| A4 = B4 = 1/64 | revolution = 1/64 | inch |
| A5 = B5 = 1/32 | revolution = 1/32 | inch |
| A6 = B6 = 1/16 | revolution = 1/16 | inch |
| A7 = B7 = $\frac{1}{8}$ | revolution = $\frac{1}{8}$ | inch |
| A8 = B8 = $\frac{1}{4}$ | revolution = $\frac{1}{4}$ | inch |
| A9 = B9 = $\frac{1}{2}$ | revolution = $\frac{1}{2}$ | inch |
| A10 = B10 = 1 | revolution = 1 | inch |
| A11 = B11 = 2 | revolutions = 2 | inches |
| A12 = B12 = 4 | revolutions = 4 | inches |
| A13 = B13 = 8 | revolutions = 8 | inches |
| A14 = B14 = 16 | revolutions = 16 | inches |
| A15 = B15 = 32 | revolutions = 32 | inches |

Figure 2B:
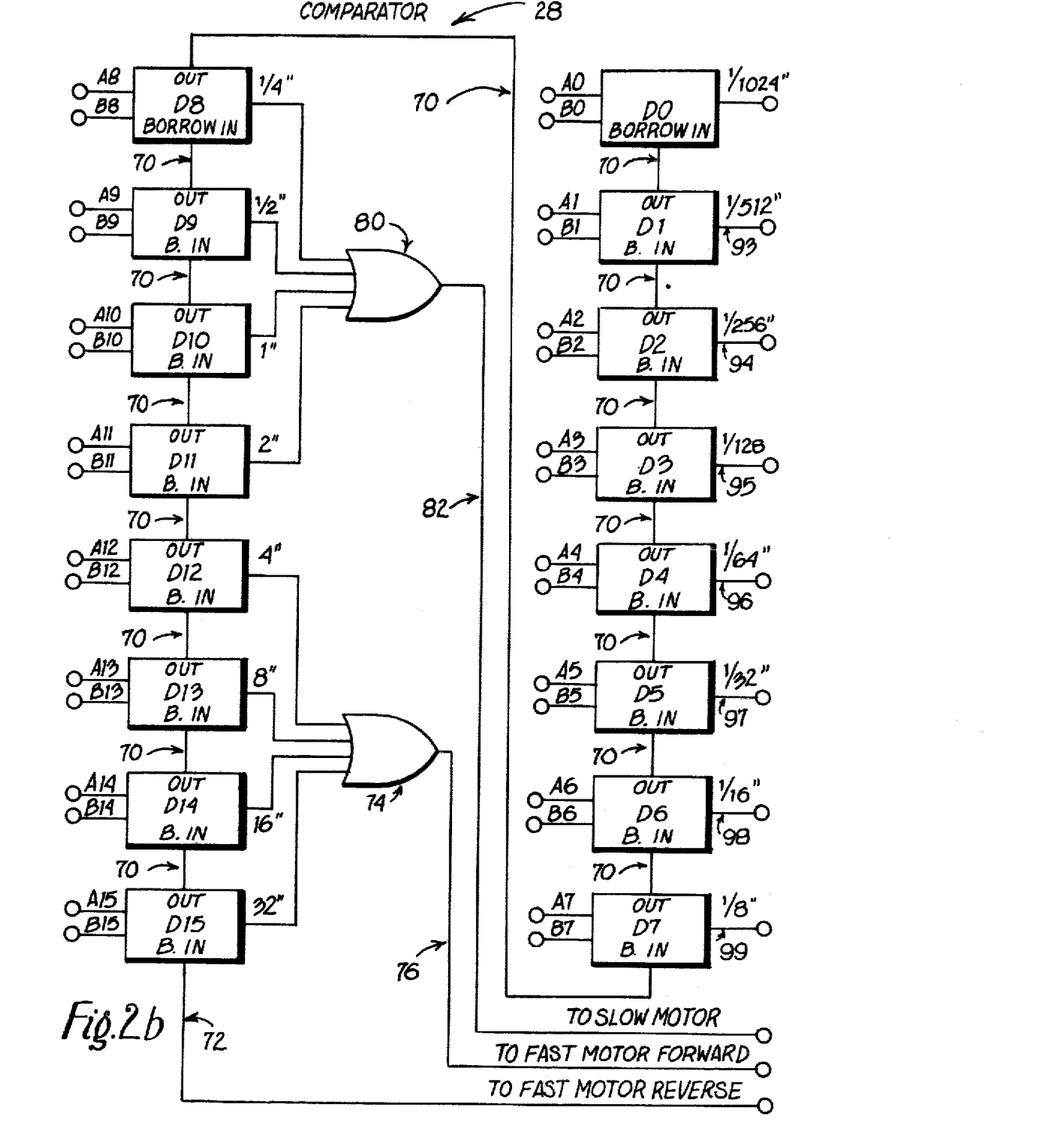

As shown in FIG. 2B, the digital comparator 28 comprises 16 full subtractors, indicated by the letter "D" combined with the numerals 0 through 15. The subtractor D0 compares the signals from bits A0 and B0 of the command 30 and shaft encoder 26, respectively. Subtractor D1 compares A1 and B1, subtractor D2 compares A2 and B2, subtractor D3 compares A3 and B3, and so on, in ascending order from the smallest bits to the largest bits.

Each subtractor is connected to the next subtractor in the series by a borrow line 70, which provides a "borrow in" from each lower order subtractor to the "borrow out" of the next higher order subtractor. The largest order subtractor 65 has a "borrow in" line 72 connected to the fast motor reverse, for the purpose of activating fast motor reverse in case of accidental "overshoot", or in case the next signal calls for a position closer to the base position.

The digital number representing the difference between the reference number (A0–A15) and the position number (B0–B15) represents the difference between the desired position of the lead screw 12 and its actual position. The reference signals, derived from the command 30, may be obtained from a switch bank, or any other suitable digital source, such as a microprocessor or counter.

As shown, the four highest order subtractors D12, D13, D14, and D15 are used to control operation of the fast motor forward position of the system operation. This use of four bits to actuate the fast motor forward control is arbitrary, but it provides a convenient way of determining crossover between operation of the high speed motor and operation of the low speed motor. In the illustrated version, the output leads from subtractors D12, D13, D14 and D15 are inputs to an OR element, or gate, 74. Thus, as long as a difference signal is indicated by any one of those four subtractors, the high speed motor will operate. This may be accomplished by conveying the output of the OR gate 74 via lead 76 to a relay switch 78 (see FIG. 4).

Figure 4:
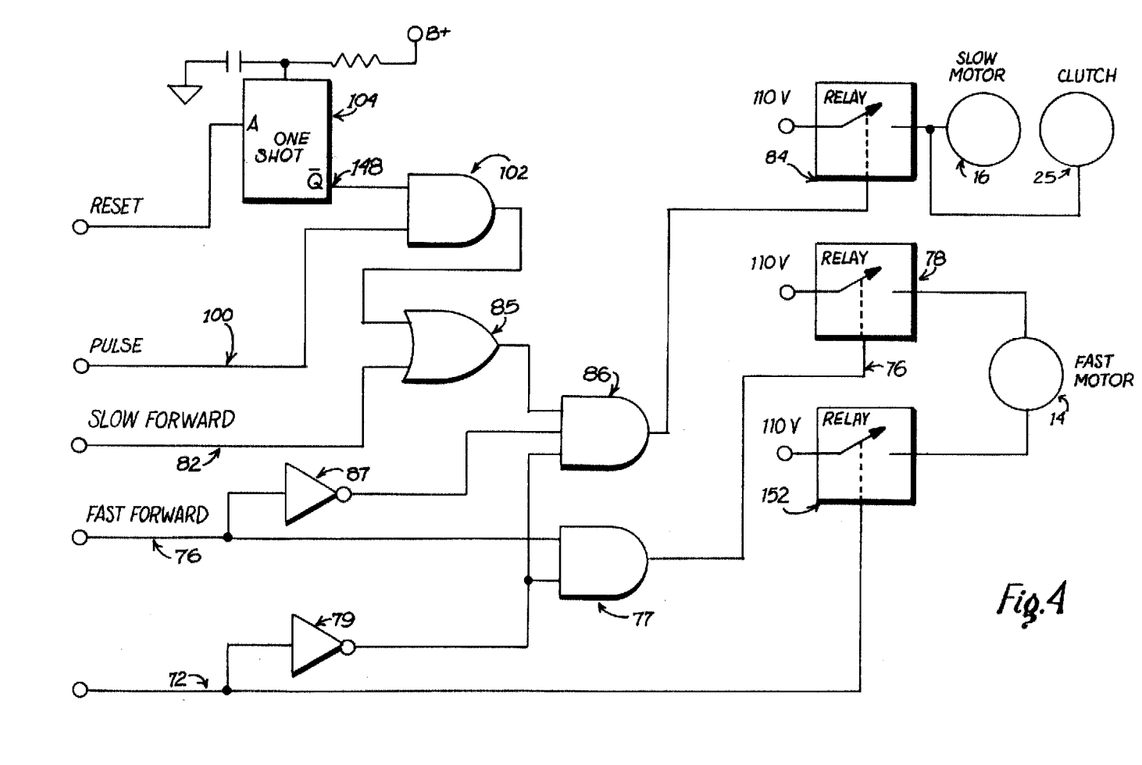
FIG. 4 is a subsystem diagram of the remaining portion of the electronic control system included in FIG. 1, comprising the three parts designated "Motor Control" therein.

In order to prevent closing of switch 78 if an actuation signal is present on the fast motor reverse line 72, an AND gate 77 in line 76 has two inputs, the input from OR gate 74 and an inverted input via inverter 79 from fast motor reverse line 72. Thus an actuation, or true, signal on line 72 will input a false signal to AND gate 77, preventing an output to switch 78. If the signal on line 72 is false, gate 77 will output a true signal, and switch 78 will remain closed as long as an actuation signal is supplied from any one of the four highest order subtractors—D12, D13, D14 or D15—representing values of 4 inches, 8 inches, 16 inches or 32 inches, respectively. When no actuating signal exists on OR gate 74, the relay switch 78 will be automatically opened by its biasing means, thereby stopping the fast motor 14. At that time the difference signal will be less than 4 inches. During the time the fast motor is driving the lead screw, the slow motor clutch is disconnected.

The next portion of the system's operation is movement of the lead screw 12 by the slow motor 16, until the remaining distance is small enough to bring the system into its final, pulse-controlled, "settling in" phase. The next four highest order subtractors D8, D9, D10 and D11 are used to control operation of the first portion of the slow motor movement. This use of four bits to actuate the first portion of the slow motor motion is also arbitrary. As shown, the output leads from subtractors D8, D9, D10 and D11 are inputs to an OR element, or gate, 80, which will cause continuous movement of the slow motor until no difference signal is present on those four subtractors. This may be accomplished by conveying the output of OR gate 80 via lead 82 to a relay switch 84 (see FIG. 4).

This signal passes through an OR gate 85 and an AND gate 86 on its way to switch 84. The AND gate 86 has three inputs, two of which are inverted inputs via inverters 79 and 87 from the fast motor reverse lead line 72 and from the fast motor forward lead line 76. With a true, or actuating, signal on either of these lines, AND gate 86 will not output an actuating signal to close switch 84. However, when all three inputs to AND gate 86 are true, a signal will output causing switch 84 to close. OR gate 85 also transmits motorcontrolling signals to switch 84 during the final, pulse-controlled motion of slow motor 16.

Switch 84 will remain closed as long as an actuation signal is supplied from any one of the four subtractors—D8, D9, D10 or D11—representing values of $\frac{1}{4}$ inch, $\frac{1}{2}$ inch, 1 inch and 2 inches, respectively. When no actuating signal exists on OR gate 80, the switch 84 will no longer be held in closed position by a signal from line 82, and will open the motor-driving circuit, causing the slow motor 16 to stop, unless a drive signal is coming from the pulsing portion of the circuit. At that time the difference signal will be less than ¼ inch.

Figure 3:
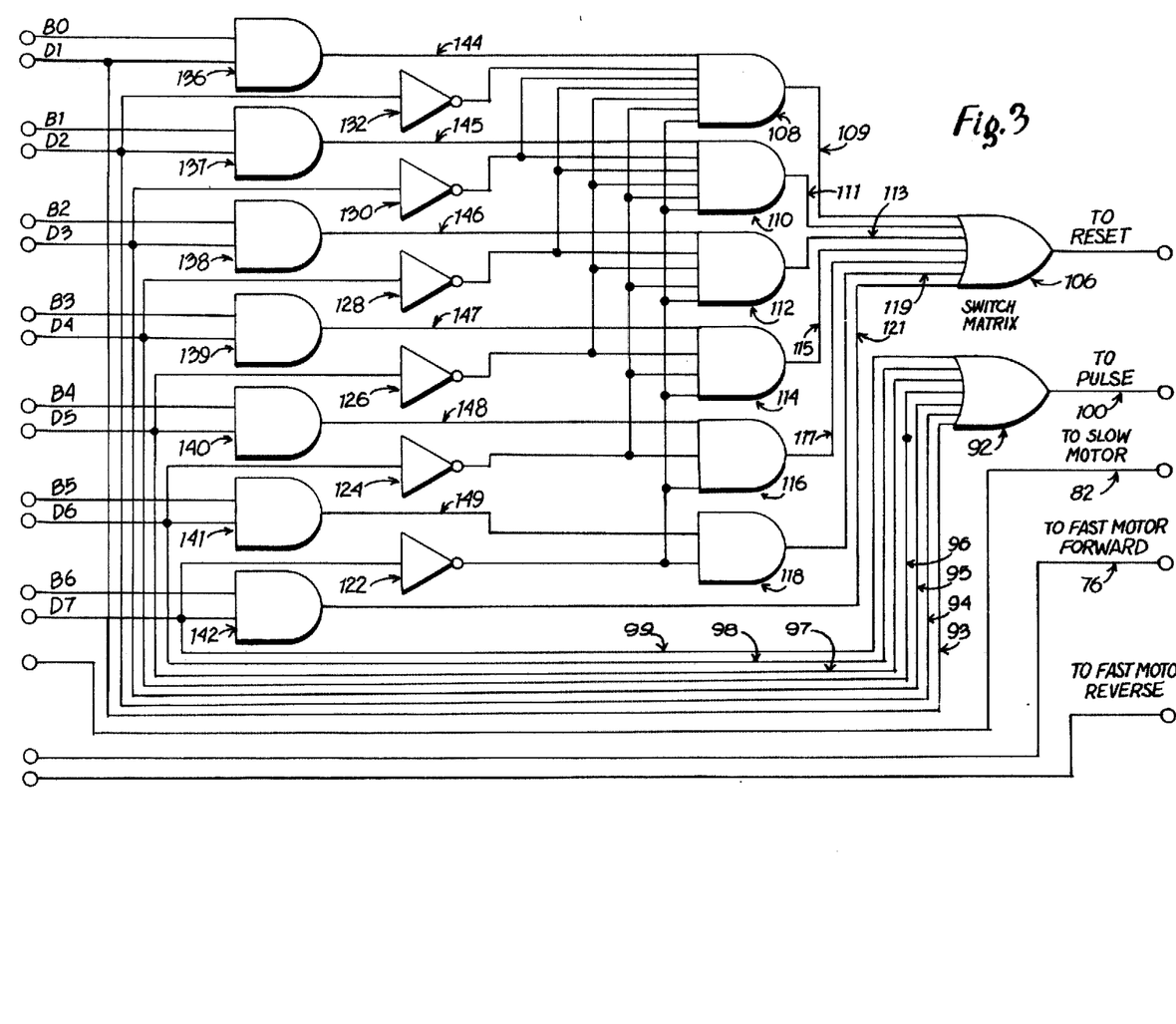
FIG. 3 is a subsystem diagram of a second portion of the electronic control system included in FIG. 1, comprising the part designated "Switch Matrix" therein.

From this point on, the distance-representing actuating pulses take over control of movement of slow motor 16. As shown in FIGS. 2B and 3, pulses to close relay switch 84 pass through an OR element, or gate, 92, to which seven input lines—93, 94, 95, 96, 97, 98 and 99—are connected. Line 93 is connected to the 1/512 inch output signal of subtractor D1, Line 94 to the 1/256 inch output signal of subtractor D2, line 95 to the 1/128 inch output signal of subtractor D3, line 96 to the 1/64 inch output signal of subtractor D4, line 97 to the 1/32 inch output of subtractor D5, line 98 to the 1/16 inch output of subtractor D6, and line 99 to the ⅛ inch output of subtractor D7.

As long as a difference signal exists on any one of the seven inputs to OR gate 92, an output pulse will be present on line 100 which inputs to an AND gate 102 (see FIG. 4). If a true signal is on the other input to AND gate 102, a pulse will pass through OR gate 85 to close relay switch 84, thereby causing motor 16 to move.

The motion of motor 16 during this final, settling-in phase is in incremental steps of descending size because of a one-shot device 104 (see FIG. 4) which causes motor 16 to stop at the end of each successive reduced bit of remaining distance. Because the arrangement shown uses each remaining binary bit in order of descending size proceeding from the highest bit to the lowest bit, the incremental distance moved between each stopping of motor 16 will be approximately one-half of the remaining distance to the destination position. It will be apparent that a smaller fraction of the remaining distance, such as one-fourth, could be used as the successive increment size, if dictated by the coasting tendencies of the motor and by a relatively low frictional resistance of the load.

As shown in FIG. 3, the step down aspect of the incremental motor distance movements is assured by inverters which prevent any signal except the largest remaining bit from determining the point at which the motor stops before it enters the next lower distance increment. In fact, an increment of a particular size may be skipped in the progression if the motor coasts through it.

The reset signal to one-shot device 104 comes through an OR gate 106 which receives seven inputs. The smallest bit input to gate 106 is through an AND gate 108 and lead 109. The next larger bit input to gate 106 is through an AND gate 110 and lead 111. The next larger bit input is through an AND gate 112 and lead 113. In ascending order, the larger bit inputs are through an AND gate 114 and lead 115, through an AND gate 116 and lead 117, through an AND gate 118 and lead 119, and directly via lead 121.

In descending order, the largest remaining bit controls the increment of motor movement by disabling, or inhibiting, all lower bits, so that the distance motor 16 moves before it is stopped by one-shot device 104 is determined by the largest remaining bit. Line 99 from ⅛ inch subtractor D7 inputs to an inverter 122 which disables AND gates 108, 110, 112, 114, 116 and 118 as long as a true signal is on line 99. Line 98 from 1/16 inch subtractor D6 inputs to an inverter 124 which disables AND gates 108, 110, 112, 114 and 116 as long as a true signal is on line 98. Line 97 from 1/32 inch subtractor D5 inputs to an inverter 126 which disables AND gates 108, 110, 112 and 114 as long as a true signal is on line 97. Line 97 from 1/64 inch subtractor D4 inputs to an inverter 128 which disables AND gates 108, 110 and 112 as long as a true signal is on line 96. Line 95 from 1/128 inch subtractor D3 inputs to an inverter 130 which disables AND gates 108 and 110 as long as a true signal is on line 95. And line 94 from 1/256 inch subtractor D2 inputs to an inverter 132 which disables AND gate 108 as long as a true signal is on line 94.

Whenever one of the AND gates 108, 110, 112, 114, 116 or 118 is not disabled by an inverter controlled by a higher priority line, its operation of reset device 104 is controlled by a signal from another AND gate which receives input signals both from the encoder 26 and from one of the subtractors. Also, line 121 carries inputs directly from such an AND gate to OR gate 106. There are seven such AND gates—136, 137, 138, 139, 140, 141 and 142. The first six input, respectively, to AND gates 108, 110, 112, 114, 116 and 118, via lines 144, 145, 146, 147, 148 and 149. The seventh, AND gate 142, is connected directly to OR gate 106 by line 121.

Each of the AND gates 136 through 142 has two input signals, one from the highest remaining subtractor bit and the other from the next lower encoder bit. For example, AND gate 142 has inputs from D7, the subtractor representing a difference signal of ⅛ inch, and from B6, the encoder position representing the next lower order bit, 1/16 inch. Since one-shot device 104 requires the leading edge of a true pulse to trigger it, it is necessary that the AND gate 142 start with a false output and then shift to a true output. For this reason two inputs to each AND gate 136 through 142 are required. While some of the descending bits may not trigger the one-shot device, due to non-coincidence of the inputs to a particular one of such AND gates, a number of operations of one-shot device 104 are certain to occur during movement of the driven element to its destination.

With a true input to AND gate 142 from subtractor D7, a change from false to true of the input from the B6 encoder position signal will output a true pulse from gate 142, via line 121. This will send an actuating signal through OR gate 106 to the one-shot device 104.

That signal will cause the one-shot device to present a false signal at the $\overline{Q}$ port 148, thereby disabling AND gate 102, which has the effect of removing the signal to close relay 84. The relay therefore opens the circuit, causing motor 16 to stop. After the predetermined time delay provided by operation of the one-shot device, it returns to its original status, reversing the false signal at $\overline{Q}$ port 148. This provides a true signal at the input to AND gate 102 from one-shot device 104. If a true signal still exists on line 100 from any of the lower order subtractors, indicating a remaining distance needs to be moved, relay 84 will again be closed to start motor 16.

The inputs to AND gate 141 are from the next lower order subtractor and the next lower order encoder position. Specifically, they are D6, representing 1/16 inch at the subtractor, and B5, representing 1/32 inch on the encoder. The inputs to the next lower AND gate 140 are from subtractor D5, representing 1/32 inch, and from encoder position B4, representing 1/64 inch. This relationship continues down the scale, through AND gates 139, 138 and 137; and terminates in AND gate 136, which receives inputs from subtractor D1, representing 1/512 inch, and from encoder position B0, representing 1/1024 inch.

One-way reset device 104 is therefore triggered by signals representing progressively lower distances, as the controlled element (12 in FIG. 1) moves toward its final position. After the one-shot device 104 has been triggered for the final time, the motor will stop when there is no longer a true signal on the pulse line 100, and thereafter relay switch 84 will remain open.

Since the interim target position for each triggering of the one-shot device is determined by the next lower distance bit from the encoder, it would seem at first blush that the AND gates 136 through 142 would not be necessary, and that encoder signals B0 through B6 could go directly to OR gate 106 to trigger the one-shot device 104. In other words, each encoder signal in descending order would trigger the one-shot device to stop the motor after it moved half the remaining distance to the destination. However, the one-shot device, in the disclosed system, triggers only on the leading edge of a pulse going from low to high. In other words, the reset looks for a transition rather than a level. Therefore, after the one-shot device has been triggered, the signal to such device must change from true to false in order for the next bit in descending order to again trigger the one-shot device. This is accomplished by using the AND gates 136 through 142; and by providing inputs to each such gate both from the next lower encoder bit, such as B6, and from the higher subtractor signal, such as D7. Thus, when the higher subtractor distance signal on each gate goes to false, that gate will be disabled, and it will no longer provide a true signal at the one-shot device. Then the next positive-going leading edge from the next lower order AND gate will not be prevented from triggering the one-shot device by a continuing, overriding true signal from a higher order gate.

Figure 7:
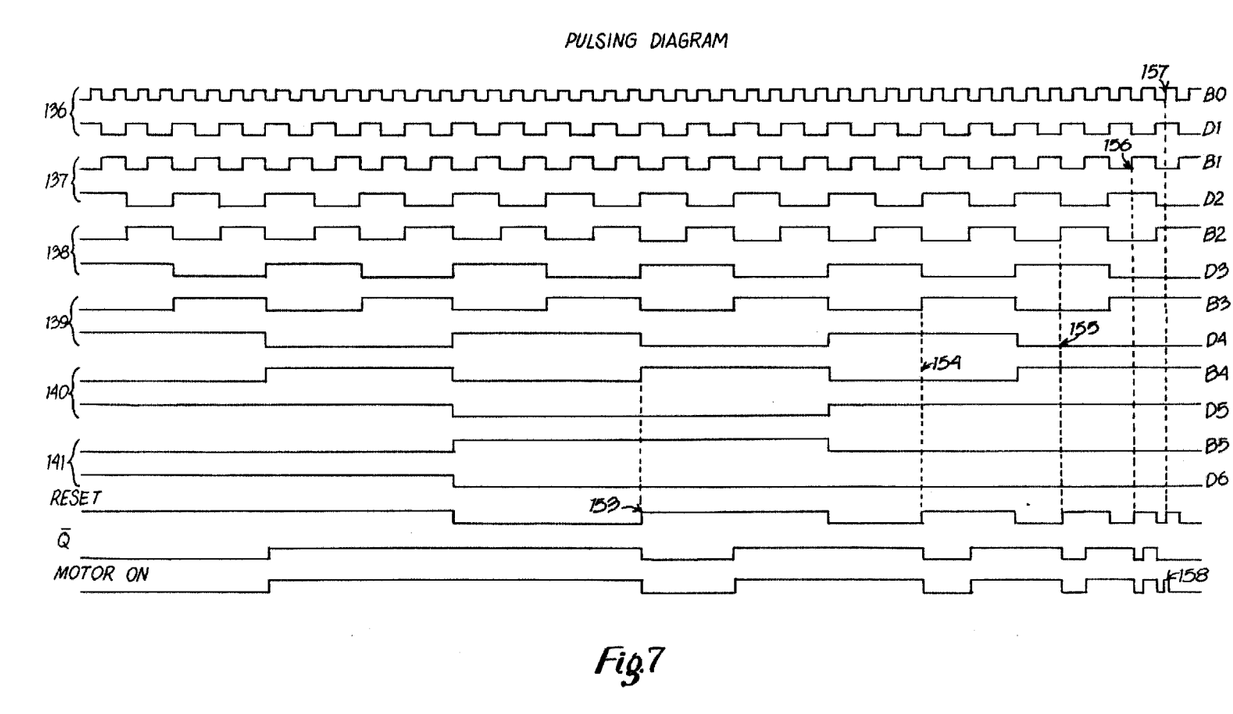
FIG. 7 is a pulsing diagram showing the pulsing activity at various points in the electronic circuitry of the previous figures.

FIG. 7 is a pulsing diagram showing the pulsing activity which controls reset (one-shot) device 104. The horizontal dimension of the diagram represents distance. Therefore, the pulse widths shown in the figure represent increments of distance, not increments of time.

The bulk of the diagram consists of six bracketed pairs of pulse lines, each of which pairs represents the two input signals at one of the AND gates 136 through 141. The pulse signals to the remaining AND gate 142 are not shown because space does not permit. The first two lines represent the B0 and D1 signals to AND gate 136, the D1 pulses having twice the width (distance) of the B0 pulses. The position of the B pulses (from the encoder) relative to the D pulses (from the comparator) might in actuality be shifted horizontally from the relationship shown, but it would not significantly alter their functional relationship.

The third and fourth lines of the pulsing diagram represent the B1 and D2 signals to AND gate 137; the fifth and sixth lines represent the B2 and D3 signals to AND gate 138; and so on through the eleventh and twelvth lines, which represent the B5 and D6 signals to AND gate 141.

The next line on the diagram is the reset line, which shows the positive-going leading edges which trigger the one-shot device 104. One such triggering (not shown) would occur approximately at the left side of the diagram. The next triggering is caused by the leading edge 153 on pulse line B4. A vertical dashed line runs down to the leading edge of a pulse on the reset line, which causes motor 16 to turn off. Note that the D5 signal at AND gate 140 is true, so gate 140 will trigger the one-shot device when a true signal appears on B4. At the same time, the higher order AND gates 141 and 142 are disabled. The next triggering is caused by the leading edge 154 on pulse line B3. A vertical dashed line runs down to the leading edge of the next pulse on the reset line, which again causes motor 16 to turn off. Note that the D4 signal at AND gate 139 is true, so gate 139 will trigger the one-shot device when a true signal appears on B3. Following down the dashed line, it will be seen that both signals are false at the next higher order AND gate 140, but that AND gate 141 would not be disabled were it not for a false signal at D6.

Subsequent pulse leading edges which trigger the one-shot device are at 155 on pulse line B2, at 156 on pulse line B1, and at 157 on pulse line B0. In each case the second signal at the triggering AND gate is true concurrently with the occurrence of the leading edge from the encoder, and all higher order AND gates are disabled by their signals from the comparator. The width of the pulses on the reset line is equal to the width of the encoder pulses which successively trigger the one-shot device.

The last two lines on the diagram represent, respectively, the "$\overline{Q}$" signals from the one-shot device and the "Motor On" pulses. Except for the final pulse 158 on the "Motor On" line, the motor is running during the $\overline{Q}$ true pulses, and is turned off when $\overline{Q}$ is false, because of the relationship between the $\overline{Q}$ signals and AND gate 102, which controls relay 84. The final "Motor On" pulse 158 occurs because of the final error signal from comparator D1 which travels via "pulse" line 93. When the error is substantially zero, i.e. below the D1 distance of 1/512 inch, the motor stops because AND gate 102 is disabled by lack of a true signal on "pulse" line 100, even though a true signal continues to input from $\overline{Q}$ to AND gate 102. In other words, the motor has one final pulse which is not stopped by the reset device. Note that the width of the $\overline{Q}$ pulses reduces from left to right, even though the $\overline{Q}$ pulses represent equal time intervals. This is true because a lower momentum of the motor is attained during the successively shorter distance movements by the motor between successive triggerings of the one-shot device.

The incremental settling-in motion of the control system substantially insures against overshoot beyond the target position. If overshoot should accidentally occur, a true signal will be produced on line 72 leading to a relay switch 152. Closing of switch 152 causes reverse motion of the fast motor 14, which will move the shaft 12 and the work table 10 in the reverse direction until the actuating signal on line 72 disappears. At this point, it will be necessary for the system to resume its forward incremental settling-in motion.

The foregoing system can be operated using equal increments of settling-in motion. Such a system would have significant benefits over prior art systems. However, substantially greater benefits can be provided by using the "stepping-down" concept, in which the increment sizes are reduced, step-by-step, as the system approaches its destination position, each increment of movement having an iterim target whose distance is shorter than that of the preceding interim target. The "stepping-down" system provides an ideal combination of relative speed in approaching the target position with exceptional accuracy in reaching the desired position.

From the foregoing explanation of the present invention, it will doubtless be apparent to those skilled in the art that the most economical and flexible way in which to accomplish the invention, and therefore the preferred embodiment, will utilize a microprocessor appropriately programmed to provide a control system incorporating the inventive concepts heretofore described. A microprocessor provides a straightforward means of implementing this method of motor control. It has the advantage that is can provide positioning over a number of points, as in an automatic control sequene, and can communicate directly with the operator by means of displays and controls, providing an integrated system with comparatively few components. Such a microprocessor-operated control system is illustrated in FIGS. 8 and 9.

Figure 8:
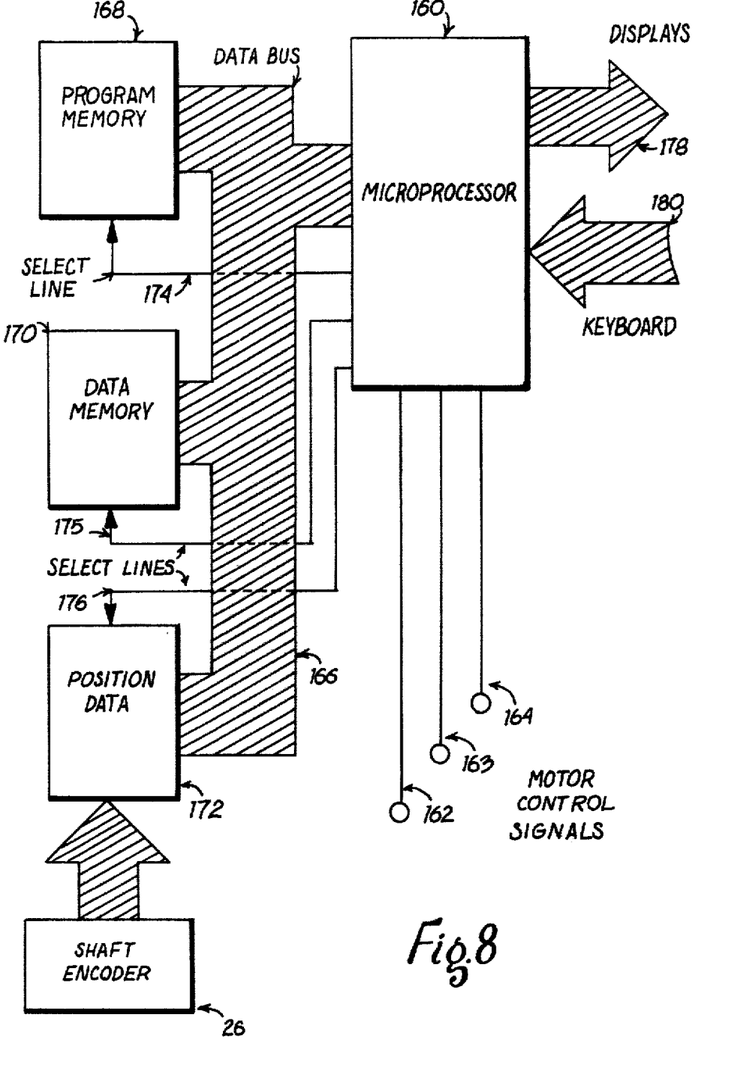
FIG. 8 is a block diagram showing the basic components of the preferred version of the invention incorporating a suitably programmed microprocessor.

As shown in block diagram form in FIG. 8, a microprocessor 160 provides motor control signals via lines 162, 163 and 164. The microprocessor communicates with the data used for control purposes by means of a data bus 166, which may be 8 bits wide, i.e., may provide an 8-line communication channel between the microprocessor 160 and the data input sources. Those sources are a program memory 168 having read only capabilities, a data memory 170 having read and write capabilities, and a position data source 172 having read only capabilities. The position data source 172 is supplied with data by the shaft encoder 26. Select lines 174, 175 and 176 lead from microprocessor 160 to the program memory 168, data memory 170, and position data source 172, respectively. A display output line 178 may lead from microprocessor 160; and a keyboard input line 180 may lead into microprocessor 160.

Figure 9:
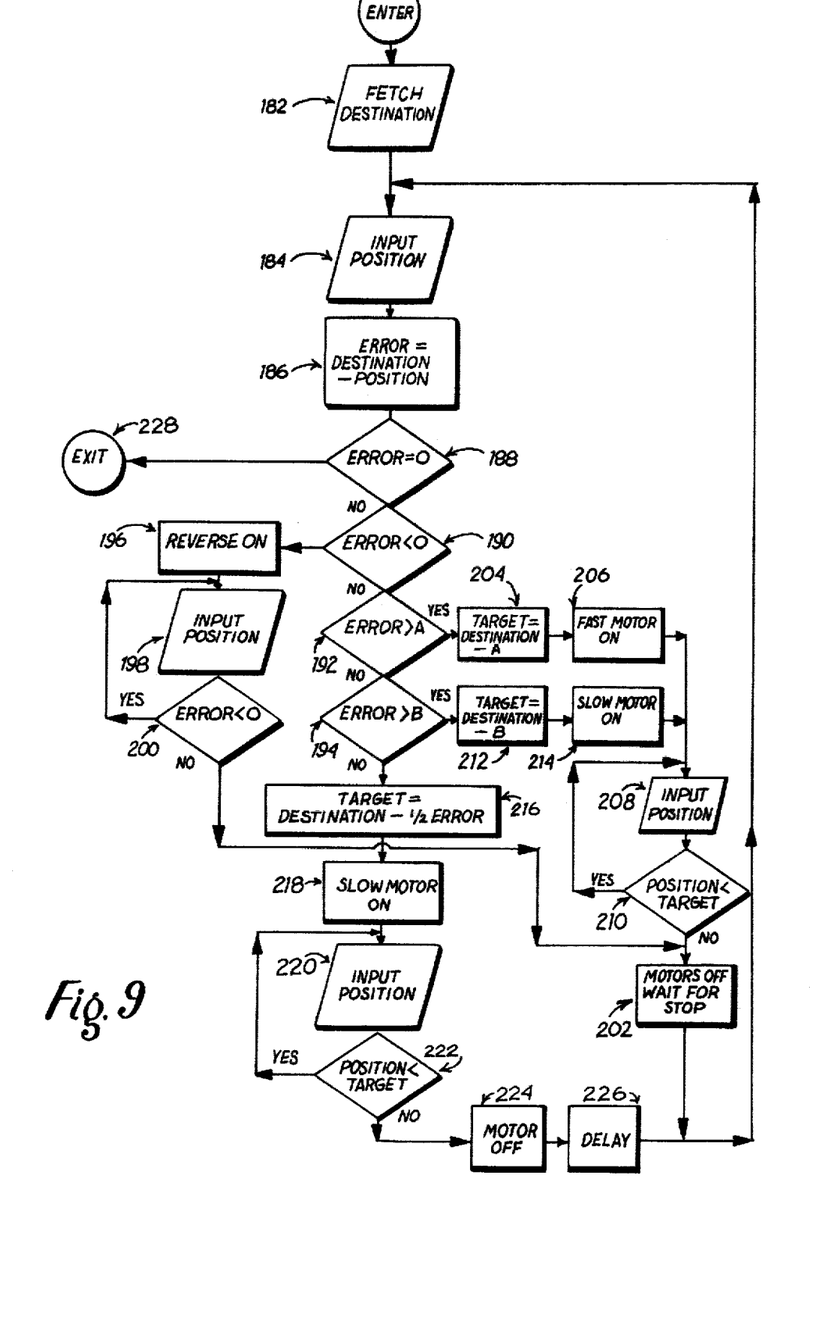
FIG. 9 shows a program flow diagram for the microprocessor version exemplified by FIG. 8.

FIG. 9 shows a flow, or logic, diagram which summarizes the operation of the positioning system under the control of microprocessor 60. In this block diagram, the diamond-shaped blocks are used to denote decisions, or branches; the rectangular blocks are used to denote processes; and the parallelogram blocks are used to denote input signals.

As shown by the flow chart, the first step is to fetch or receive the destination of the controlled element. This is illustrated by input block 182. Next, the position of the driven element is caused to provide an input, obtained from the encoder or other position reference (see input block 184). The difference between the destination and the position, i.e., the error, is next obtained, as shown by process block 186. (It is assumed that forward motion is from a lesser to a greater position.)

Next on the flow chart are four decision blocks 188, 190, 192 and 194. First, block 188 determines whether the error is substantially zero. If the answer is "yes", the path goes to exit, and no motor movement is required. If the answer is "no", the path goes to the next decision block 190.

Block 190 determines whether the error is less than zero. If it is, the "yes" branch goes to the reverse motor process block 196, which causes the fast motor reverse control 40 to operate fast motor 14 in reverse. Then the logic path leads to a loop which continues to circulate until the error is no longer less than zero. This loop consists of an input position block 198, which indicates the actual position of the encoder, and a decision block 200. As indicated by decision block 200, if the errror is still less than zero, the logic path loops back to the input side of position block 198.

This loop continues in effect until decision block 200 indicates the error is no longer less than zero. Then the path leads to a process block 202, which turns the motor off and waits for it to stop. The path then goes back to obtain an input position reading as shown by block 184, and to then re-determine the error at process block 186. If both block 188 and block 190 provide a "no" answer, block 192 will determine whether the error is greater than a predetermined amount "A". If the answer is "yes", the interim target position will be established as the final destination minus distance "A", as shown by process block 204. Then the fast motor 14 is energized in the forward direction by fast motor forward control 38 (see process block 206).

The path then leads to a circulating loop which includes a position input block 208 representing the then current encoder position, and a decision block 210 which continues the loop through block 208 as long as the position is less than the interim target (as predetermined by block 204). When the position is no longer less than the interim target, block 210 leads to block 202, causing the fast motor to turn off, and then waiting for it to stop. At this point the path recirculates to input position block 184, and the position of the driven element (encoder) is again an input to the control cycle.

Assuming that blocks 188, 190 and 192 all provide negative answers, it will then be determined at decision block 194 whether the remaining error is greater than a predetermined amount "B" (which is, of course, less than the amount "A" previously considered). If the answer is "yes", the interim target position will be established as the final destination minus distance "B", as shown by process block 212. Then the slow motor 16 is energized by slow motor control 36 (see process block 214).

The path then leads again to the circulating loop which includes input position block 208 and decision block 210, which compares the actual position with the interim target (as predetermined by block 212). When the position is no longer less than the interim target, block 210 leads to block 202, causing the slow motor to turn off, and then waiting for it to stop. At this point the path recirculates to input position block 184, and the position of the driven element (encoder) is once more an input to the control cycle.

The system is now ready to enter the domain of pulsed control. Under pulsed control, an intermediate target, halfway to the final destination, is defined. The slow motor is turned on until this point is reached, and then turned off for a constant period "T", after which the main decision matrix is re-entered. In this fashion, successively smaller increments of position accrete until the error is reduced to zero. As previously indicated, the intermediate target of each distance pulse could be a fraction other than half of the remaining error, in order to accommodate the characteristics of the system (friction and inertia).

As shown in the flow chart, if each of the decision blocks 188, 190, 192 and 194 provides a "no" answer, the path leads to process block 216, which determines the intermediate target position as the final destination minus one-half of the error. Then as indicated by process block 218, the slow motor 16 is caused to turn on. The path now leads to a circulating loop comprising an input position block 220, and a decision block 222 which compares the actual position to the intermediate target position (i.e., destination minus one-half error). As long as the position is less than the target, the loop comprising blocks 220 and 222 continues in effect. When the position is no longer less than the target at block 222, the path leads to process block 224, the slow motor 16 is turned off, and a constant period time delay is caused (see process block 226). When the delay is completed, the path recycles to input position 184.

At this point a new intermediate target position will be determined at process block 216. It will equal the final destination less one-half of the remaining error; and it will therefore represent a smaller distance increment than the previous control step. The slow motor will again be turned on (see block 218), and the path re-enters the circulating loop comprising input position block 220 and decision block 222. When the position is no longer less than the latest intermediate target, the slow motor will again be turned off (see block 224), and the constant time delay will again occur (see block 226).

Then a new target position will be determined at process block 216, once again reduced to one-half of the remaining distance (final destination minus one-half error). This step-by-step, incremental, start-and-stop process will continue through successively smaller increments of movement of the driven element (as measured by the encoder) until decision block 188 indicates that the error is close enough to zero to cause an exit at 228, ending the position-finding process.

It will be recognized that the firmware-controlled system disclosed in the flow chart permits greater flexibility in design than the circuit disclosed in the earlier figures. Thus various modifications can be implemented much more easily as the design parameters of a given motor control system are determined.

The following claims are intended not only to cover the specific embodiments disclosed, but also to cover the inventive concepts explained herein with the maximum breadth and comprehensiveness permitted by the prior art.

What we claim is:

1. A motor control apparatus, for a positioning system having a driven element which settles into its desired position from one direction only, comprising:
   a motor which moves continuously from its energization until its deenergization, said motor having movement increments of variable magnitude, the beginning position of each movement increment being determined solely by its energizing signal and the end position of each movement increment being determined solely by its deenergization plus any coasting thereafter;
   a position-to-digital transducer which measures the position of the driven element and provides an electrical signal indicating such position in digital values;
   a digital comparator which compares the electrical signal from the transducer with a command signal representing the desired position and provides an output electrical signal indicating a difference between such signals in digital values;
   means, responsive to a difference-indicating signal from the comparator, for providing an energizing signal to the motor and selectng a next cut-off position;
   means for providing a deenergizing signal to the motor each time the next cut-off position, as indicated by the transducer signal, is reached; and
   means for providing a reenergizing signal to the motor each time the comparator continues to provide a difference-indicating signal.

2. The positioning system motor control apparatus of claim 1 wherein each successive increment of motor movement, as it is alternately energized and deenergized, covers a lesser distance than its preceding increment of movement.

3. The positioning system motor control apparatus of claim 2 wherein the means for providing deenergizing signals to the motor is arranged to establish a new interim position target after each cut-off position is reached, each such target being a position which is a fraction of the remaining distance to the desired position.

4. The positioning system motor control apparatus of any of claims 1, 2 or 3, which also comprises:
   means for initially causing the motor to move without stopping until it reaches a predetermined distance from its desired position, and thereupon to enter its alternate energizing and deenergizing phase.

5. That method of causing a driven element to be moved in one direction only into its predetermined destination position by a motor which moves continuously from its energization until its deenergization, said motor having movement increments of variable magnitude, the beginning position of each movement increment being determined solely by its energizing signal and the end position of each movement increment being determined solely by its deenergization plus any coasting thereafter, which method comprises:
   measuring the position of the driven element with a position-to-digital transducer;
   comparing the transducer-measured position with the destination position to determine the error distance;
   causing the motor to move the driven element continuously until it reaches a predetermined distance from the destination position; and
   thereafter causing the motor to alternately start and stop repeatedly in order to move in increments whose magnitude is controlled by the digital information from the transducer.

6. The method of claim 5 wherein the size of the increments moved by the motor is progressively reduced as the driven element approaches its destination.

7. The method of claim 6 wherein a control loop recurrently translates each remaining error distance into a next incremental start-and-stop signal representing a predetermined fraction of such remaining error distance.

8. That method of controlling a motor to cause it to move a driven element to a desired position, utilizing an electrical control circuit, which includes the following steps:
   utilizing a shaft encoder to provide a continuous position-indicating signal to represent the position of the driven element;
   comparing the shaft encoder position-indicating signals with desired position command signals to provide an error signal;
   causing the application of power to continuously move the motor until the error signal is less than a predetermined amount;
   thereafter providing a first interim target signal which enables the control circuit to apply power to the motor until the shaft encoder shows a first increment of distance moved;
   turning the motor power off when the shaft encoder shows that said first increment of distance has been moved;
   thereafter providing a second interim target signal which enables the control circuit to apply power to the motor until the shaft encoder shows a second increment of distance moved;

turning the motor off when the shaft encoder shows that said second increment of distance has been moved; and continuing said steps of providing interim target signals and then turning the motor off when each distance increment has been moved until the error signal has been sufficiently reduced to provide the desired accuracy of position resolution.

9. The method of claim 8 wherein each successive interim target distance increment is less than the preceding increment in accordance with a preselected fractional error reduction sequence.

10. A positioning control system, which causes a driven element to approach a command destination, comprising:

a motor which moves continuously from its energization until its deenergization, said motor having movement increments of variable magnitude, the beginning position of each movement increment being determined solely by its energizing signal and the end position of each movement increment being determined solely by its deenergization plus any coasting thereafter;

a position-measuring device which develops a signal representing the actual position of the driven element;

a position-comparing device which compares the command destination to the actual position of the driven element, and develops an error signal representing the difference;

means for energizing and deenergizing the motor to cause successive increments of movement of the driven element, each continuing until a current target position has been reached; and means, responsive to the error signal, for determining a new target position after each stopping of the motor.

11. The positioning control system of claim 10 wherein the new-target-determining means changes the magnitude of each successive increment of motion of the driven element.

12. The positioning control system of claim 11 wherein the magnitude of each successive increment of motion of the driven element, except for coasting motion, is a constant fraction of the remaining distance to the destination.

13. A positioning system which moves a driven element to a desired position comprising:

a motor the magnitude of whose increments of movement is controlled by the width of the driving pulses it receives;

position-measuring means for sensing the current position of the driven element;

error-signal developing means for developing an error signal representing the distance between the current position of the driven element and its desired position;

motor-energizing means, responsive to the error-signal-developing means, for starting a driving pulse to the motor if an error signal is present;

motor-stopping means, responsive to the position-measuring means, for stopping the motor by ending each of a substantial number of successive driving pulses at its respective interim target position before the desired position is reached; and target-setting means, responsive to the error signal, for setting each new interim target position as a function of the magnitude of the error signal after the ending of each motor driving pulse.

14. The positioning system of claim 13 wherein each new interim target is a position located a fraction of the remaining distance to the desired position.

15. The positioning system of claim 13 or 14 wherein the driven element is moved by a lead screw, and the position-measuring means is a shaft encoder which senses the lead screw position.

16. The positioning system of claim 13 or 14 wherein the position-measuring means indicates the current position in digital values, and the error signal produced by the error-signal-developing means is in digital values.

17. A positioning control method which causes a driven element to approach a command destination, comprising:

driving a motor with movement increments of variable magnitude, the beginning position of each movement increment being determined solely by its energizing signal and the end position of each movement increment being determined solely by its deenergization plus any coasting thereafter;

developing a signal representing the actual position of the driven element;

comparing the command destination to the actual position of the driven element, and developing an error signal representing the difference;

energizing and deenergizing the motor to cause successive increments of movement of the motor, each continuing until a current target position has been reached; and determining a new target position after each stopping of the motor.

18. The positioning control method of claim 10 wherein each new target position changes the magnitude of each successive increment of motion of the motor.

19. The positioning control method of claim 11 wherein the magnitude of each successive increment of motion of the motor, except for coasting motion, is a constant fraction of the remaining distance to the destination.

20. A positioning method which moves a driven element to a desired position comprising:

controlling the magnitude of increments of movement of a motor by the width of the driving pulses it receives;

sensing the current position of the driven element;

comparing the current position of the driven element with its desired position to establish an error signal;

selecting a first interim target position for the driven element;

starting a driving pulse to the motor;

stopping the motor by ending the driving pulse when the driven element reaches the first interim target position;

selecting a second interim target position for the driven element;

starting a driving pulse to the motor;

stopping the motor by ending the driving pulse when the driven element reaches the second interim target position; and continuing the series of interim-target-setting, driving-pulse-starting and driving-pulse-ending sequences until the error signal is substantially zero.

21. The positioning method of claim 13 wherein each new interim target is a position located a fraction of the remaining distance to the desired position.

22. The positioning method of claim 13 or claim 14 wherein the driven element is moved by a lead screw, and the current position is measured by a shaft encoder which senses the lead screw position;

23. The positioning method of claim 13 or 14 wherein the current position is indicated in digital values, and the error signal produced is in digital values.

24. That method of causing a driven element to be moved in only one direction into its predetermined destination position by a motor which moves continuously from its energization until its deenergization, said motor having movement increments of variable magnitude, the beginning position of each movement increment being determined solely by its energizing signal and the end position of each movement increment being determined solely by its deenergization plus any coasting thereafter, which method comprises:

measuring the position of the driven element with a position-to-digital transducer;

selecting a first driving pulse width of motor energization;

beginning and ending a first driving pulse in accordance with the preselected pulse width;

after the first pulse has ended, measuring the current position of the driven element;

then selecting a second driving pulse width of motor energization;

beginning and ending a second driving pulse in accordance with the preselected pulse width;

after the second pulse has ended, measuring the current position of the driven element; and repeating the pulse-width-selecting, pulse-beginning-and-ending, position-measuring sequence until the destination position of the driven element is reached.

25. The method of claim 24 wherein each pulse width represents a distance of movement of the driven element, as measured by the position-to-digital transducer.

26. The method of claim 25 wherein the distance represented by each successive pulse width is less than the preceding pulse width.

27. The method of claim 26 wherein the distance represented by each successive pulse width is a constant fraction of the remaining distance to the destination position.